(12) United States Patent
Song et al.

(10) Patent No.: US 8,253,895 B2
(45) Date of Patent: Aug. 28, 2012

(54) VERTICALLY ALIGNED MODE LIQUID CRYSTAL DISPLAY WITH DIFFERENTIATED B CELL GAP

(75) Inventors: Jang-Kun Song, Seoul (KR);
Kyeong-Hyeon Kim, Suwon (KR);
Jae-Jin Lyu, Kyungki-do (KR);
Seung-Hee Lee, Cheongju (KR);
Seung-Beom Park, Seoul (KR);
Yong-Woo Choi, Suwon (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 12/533,895

(22) Filed: Jul. 31, 2009

(65) Prior Publication Data

US 2009/0290106 A1 Nov. 26, 2009

Related U.S. Application Data

(63) Continuation of application No. 11/444,100, filed on May 31, 2006, now Pat. No. 7,605,886, which is a continuation of application No. 10/036,305, filed on Dec. 28, 2001, now Pat. No. 7,075,600.

(30) Foreign Application Priority Data

Jul. 12, 2001 (KR) .................. 2001-42123

(51) Int. Cl.
*G02F 1/1335* (2006.01)

(52) U.S. Cl. ....................................................... 349/107
(58) Field of Classification Search ................... 349/107
See application file for complete search history.

(56) References Cited

U.S. PATENT DOCUMENTS

| 4,917,471 | A * | 4/1990 | Takao et al. ................... 349/107 |
| 6,275,274 | B1 * | 8/2001 | Kanemori et al. .............. 349/42 |
| 6,462,798 | B1 * | 10/2002 | Kim et al. ..................... 349/129 |
| 2002/0030780 | A1 * | 3/2002 | Nishida et al. ................ 349/141 |

* cited by examiner

*Primary Examiner* — Timothy L Rude
(74) *Attorney, Agent, or Firm* — F. Chau & Associates, LLC

(57) ABSTRACT

A thin film transistor array substrate is provided with a gate line assembly, a data line assembly, and thin film transistors. The data line assembly crosses over the gate line assembly while defining pixel regions. A pixel electrode is formed at each pixel region. A color filter substrate is provided with a black matrix, and color filters of red, green and blue are formed at the black matrix at the pixel regions. An overcoat layer covers the color filters, and a common electrode is formed on the overcoat layer with an opening pattern. The thin film transistor array substrate, and the color filter substrates face each other, and a liquid crystal material is injected between the thin film transistor array substrate, and the color filter substrate. The blue color filter has a thickness smaller than the red color filter or the green color filter such that the liquid crystal cell gap at the blue color filter is larger than the liquid crystal cell gap at the red or green color filter.

13 Claims, 14 Drawing Sheets

VERTICALLY ALIGNED MODE LIQUID CRYSTAL DISPLAY WITH DIFFERENTIATED B CELL GAP

CROSS-REFERENCE TO RELATED UNITED STATES APPLICATION

This application a continuation of U.S. patent application Ser. No. 11/444,100, filed on May 31, 2006, now U.S. Pat. No. 7,605,886 which is in turn a continuation of U.S. patent application Ser. No. 10/036,305, filed on Dec. 28, 2001, now U.S. Pat. No. 7,075,600 the contents of each of which are herein incorporated by reference in their entireties.

BACKGROUND OF THE INVENTION (a) Field of the Invention

The present invention relates to a vertically aligned mode liquid crystal display and, more particularly, to a vertically aligned mode liquid crystal display where a pixel region is partitioned into a plurality of micro-domains to obtain wide viewing angle.

(b) Description of the Related Art

Generally, a liquid crystal display has a structure where a liquid crystal bearing dielectric anisotropy is sandwiched between a color filter substrate and a thin film transistor array substrate. The color filter substrate has a common electrode, color filters and a black matrix, and the thin film transistor array substrate has a thin film transistor and a pixel electrode. An electric field is applied to the liquid crystal while being varied in strength, thereby controlling the light transmission and displaying the desired picture image.

Such a liquid crystal display usually involves narrow viewing angle. In order to obtain a wider viewing angle, various techniques have been developed. One such technique involves vertically aligning the liquid crystal molecules with respect to the substrates while forming opening or protrusion patterns at the pixel electrode and the common electrode.

In an opening pattern formation technique, an opening pattern is formed at the pixel electrode and the common electrode, respectively. Fringe fields are formed due to the opening patterns, and the inclined direction(s) of the liquid crystal molecules is controlled by way of the fringe fields, thereby widening the viewing angle.

In a protrusion formation technique, a protrusion is formed at the pixel electrode and the common electrode, respectively. The electric field formed between the pixel electrode and the common electrode is deformed due to the protrusions, thereby controlling the inclined direction(s) of the liquid crystal molecules.

Furthermore, it is also possible that an opening pattern is formed at the pixel electrode, while a protrusion is formed at the common electrode. Fringe fields are formed due to the opening pattern and the protrusion, and the inclined directions of the liquid crystal molecules are controlled by way of the fringe fields, thereby partitioning the pixel region into a plurality of micro-domains.

In addition, in such a vertically aligned (VA) mode liquid crystal display, the variation in light transmission based on voltages is diffused at the respective wavelengths of light, and this causes the inter-gray scale color shift. Particularly, when the gray scale reaches a higher number the white color becomes yellowish, deteriorating picture quality.

SUMMARY OF THE INVENTION

It is an object of the present invention to provide a vertically aligned mode liquid crystal display which enhances picture quality while reducing color shift.

This and other objects may be achieved by a liquid crystal display wherein the cell gap at the blue region is differentiated from the cell gap at the red or green region.

According to one aspect of the invention, a liquid crystal display includes a first insulating substrate, a plurality of first wiring lines formed on the first insulating substrate, a plurality of second wiring lines crossing over the first wiring line formed on the first wiring lines, and a plurality of pixel electrodes. The second wiring lines are insulated from the first wiring lines. A thin film transistor comprising a gate electrode is connected to the first wiring line. A source electrode is connected to the second wiring line, and a drain electrode is connected to the pixel electrode. A second insulating substrate faces the first insulating substrate; and color filters of red, green and blue are formed on at least one of the first insulating substrate and the second insulating substrate. An R cell gap indicates the thickness of the liquid crystal layer at the region of the red color filter, a G cell gap indicates the thickness of the liquid crystal layer at the region of the green color filter, and a B cell gap indicates the thickness of the liquid crystal layer at the region of the blue color filter. The B cell gap is differentiated from the R cell gap or the G cell gap by: R cell gap–G cell gap<G cell gap–B cell gap.

The liquid crystal display further includes a common electrode formed on the second insulating substrate, a first domain dividing member form on the first insulating substrate, and a second domain dividing member formed on the second insulating substrate. A liquid crystal layer is sandwiched between the first and the second insulating substrates with liquid crystal molecules. The liquid crystal molecules of the liquid crystal layer are vertically aligned with respect to the first and the second substrates when no electric field is applied between the pixel electrode and the common electrode.

The B cell gap, the R cell gap and the G cell gap are differentiated from each other. The B cell gap is established to be smaller than the R cell gap or the G cell gap by 0.2±0.15 µm.

The liquid crystal display further includes a first polarizing plate and a second polarizing plate respectively attached to the first insulating substrate and the second insulating substrate. The polarizing axes of the first and second polarizing plates are inclined with respect to at least one of the first domain dividing member and the second domain dividing member by about 45°.

Micro-domains formed by the first dividing member and the second dividing member, where the micro-domains are classified into left and right domains, and upper and lower domains. The volume occupied by the upper and lower domains is larger than the volume occupied by the left and right domains.

The distance between two neighboring second wiring lines is repeatedly varied per a predetermined length, and the pixel electrode has lateral sides positioned close to the second wiring lines with the same outline such that the pixel electrode bears a narrow portion and a wide portion.

According to another aspect of the invention, a process of manufacturing a liquid crystal display includes forming a first insulating substrate, forming a plurality of first wiring lines on the first insulating substrate, forming a plurality of second wiring lines crossing over the first wiring lines, and forming a plurality of pixel electrodes. The second wiring lines are insulated from the first wiring lines. A first domain dividing member is formed on the first insulating substrate. A second insulating substrate is formed facing the first insulating substrate. Color filters of red, green and blue are formed on at least one of the first insulating substrate and the second insulating substrate. A second domain dividing member is formed on the second insulating substrate. A B cell gap is differentiated from an R cell gap or a G cell gap by: R cell gap–G cell gap<G cell gap–B cell gap where the R cell gap indicates the thickness of the liquid crystal layer at the region of the red color filter, the G cell gap indicates the thickness of the liquid crystal layer at the region of the green color filter, and the B cell gap indicates the thickness of the liquid crystal layer at the region of the blue color filter.

The process of manufacturing further includes forming a common electrode on the second insulating substrate with the color filters. A liquid crystal layer is formed sandwiched between the first and the second insulating substrates with liquid crystal molecules. The liquid crystal molecules of the liquid crystal layer are vertically aligned with respect to the first and the second substrates when no electric field is applied between the pixel electrode and the common electrode.

The B cell gap, the R cell gap and the G cell gap are differentiated from each other. The B cell gap is formed to be smaller than the R cell gap or the G cell gap by 0.2±0.15 μm.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components, wherein.

DETAILED DESCRIPTION OF PREFERRED EMBODIMENTS

Preferred embodiments of this invention will be explained with reference to the accompanying drawings.

Figure 1:
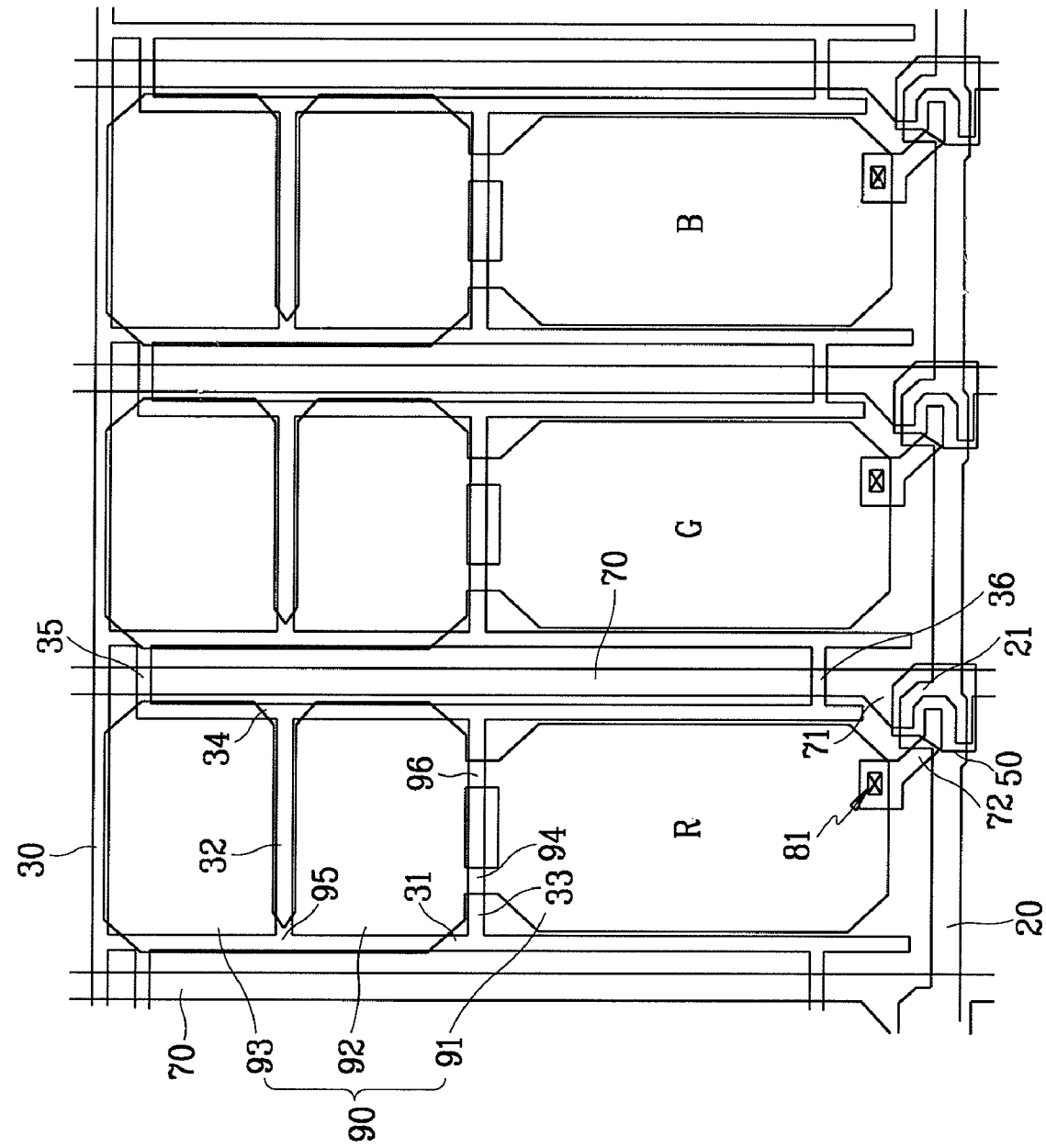
FIG. 1 is a plan view of a liquid crystal display according to a first preferred embodiment of the present invention where an opening pattern of a pixel electrode is illustrated.
Figure 2:
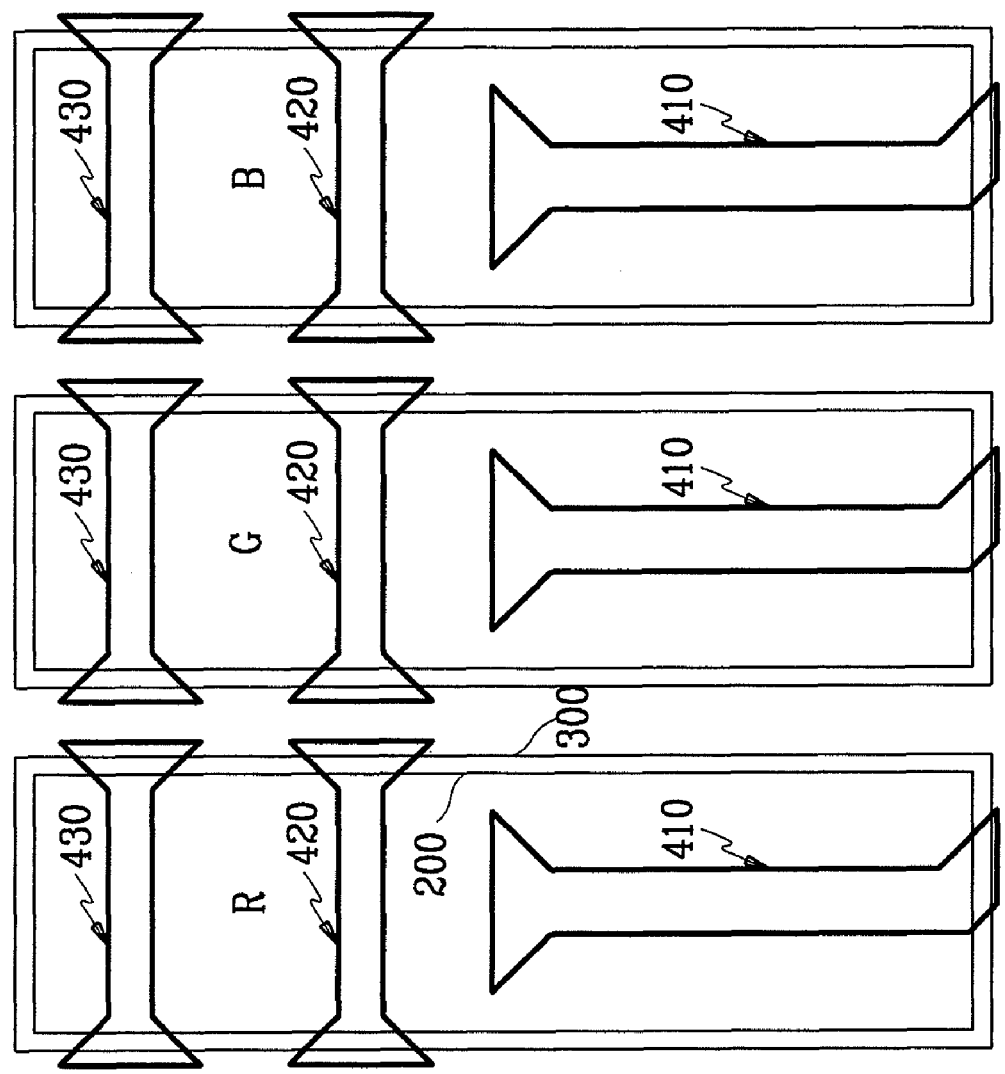
FIG. 2 illustrates an opening pattern of a common electrode for the liquid crystal display shown in FIG. 1.
Figure 3:
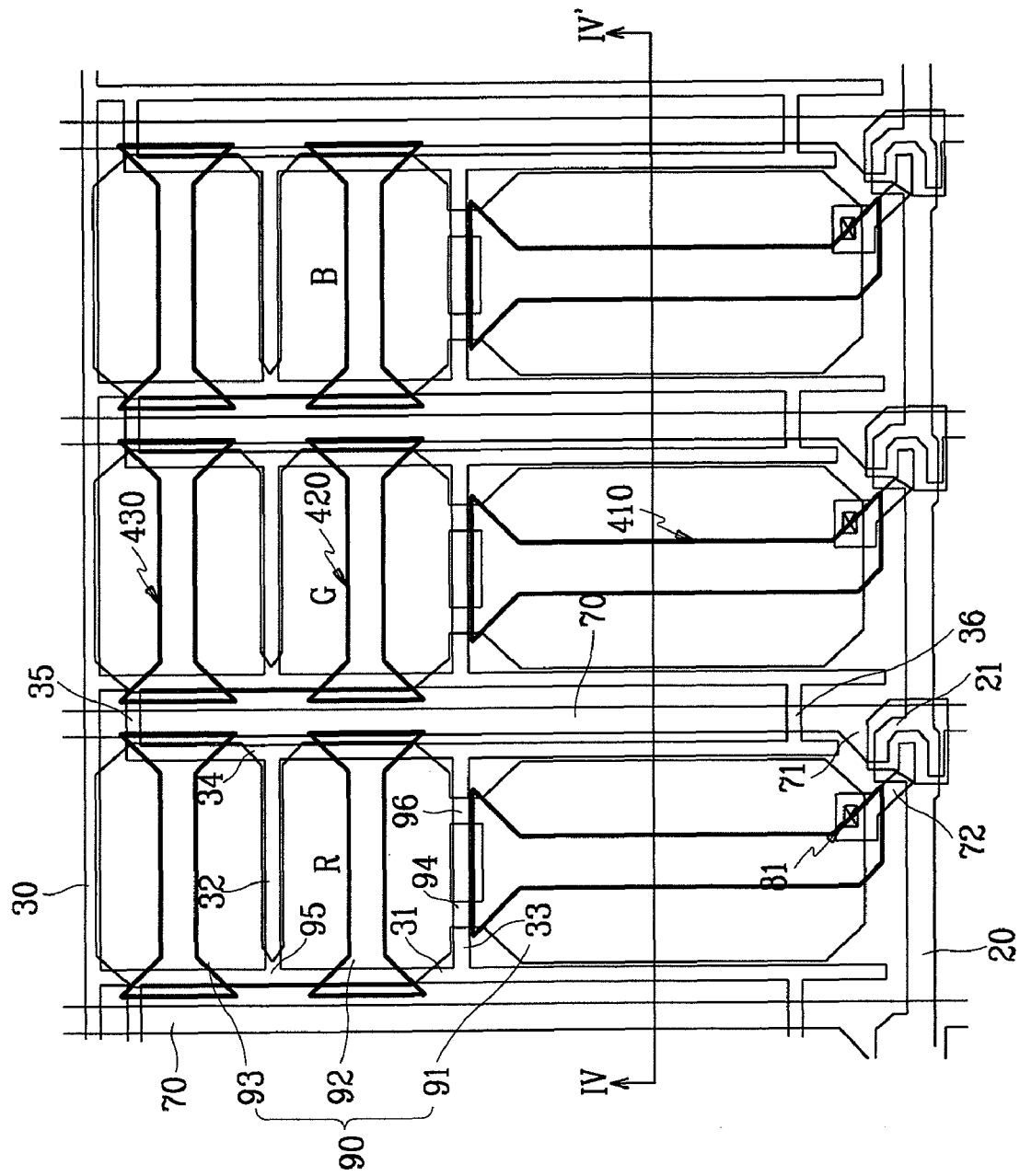
FIG. 3 illustrates the arrangement of the opening patterns of the pixel and the common electrodes for the liquid crystal display shown in FIG. 1.
Figure 4:
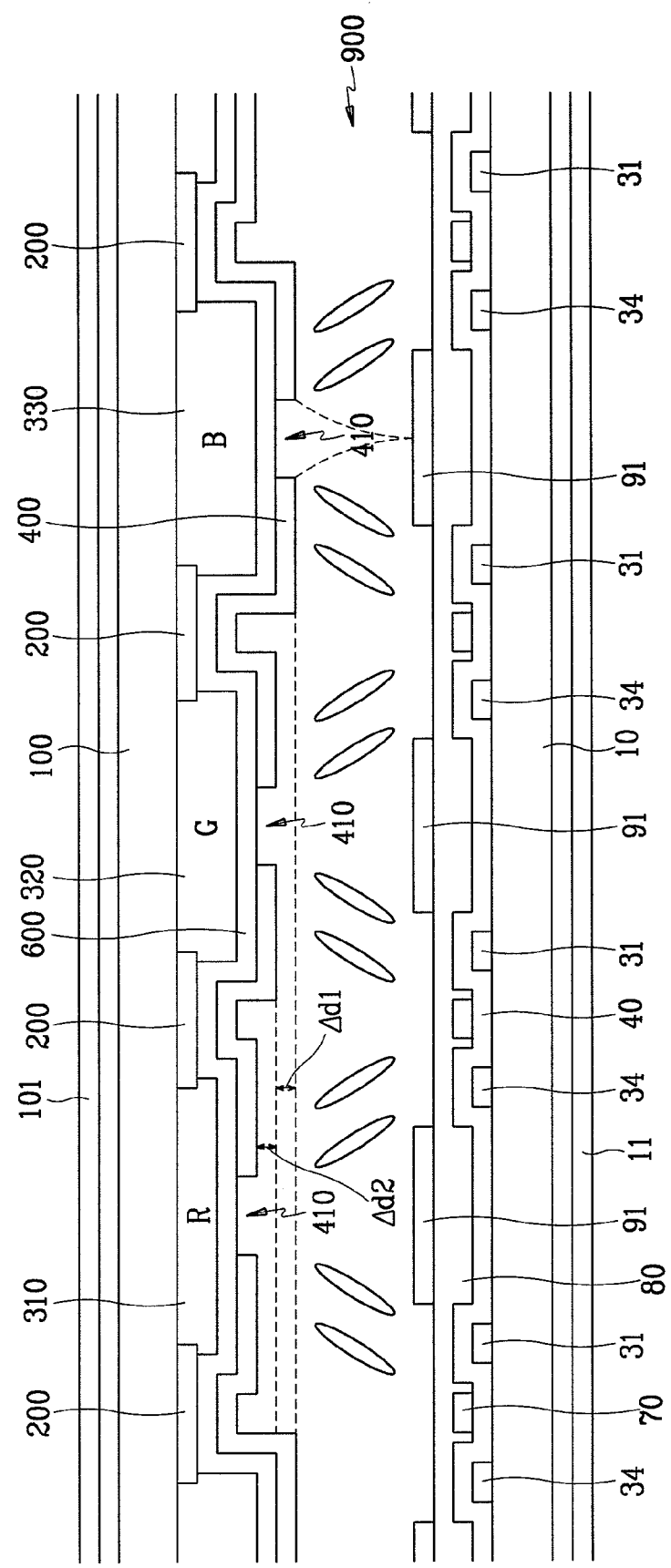
FIG. 4 is a cross sectional view of the liquid crystal display taken along the IV-IV' line of FIG. 3.

FIG. 1 is a plan view of a liquid crystal display according to a first preferred embodiment of the present invention wherein an opening pattern of a pixel electrode is illustrated, and FIG. 2 illustrates an opening pattern of a common electrode for the liquid crystal display. FIG. 3 illustrates the arrangement of the opening patterns of the pixel and the common electrodes for the liquid crystal display. FIG. 4 is a cross sectional view of the liquid crystal display taken along the IV-IV' line of FIG. 3.

As shown in FIG. 1 to FIG. 4 of the drawings, a gate line assembly and a storage capacitor line assembly are formed on an insulating substrate 10. The gate line assembly includes gate lines 20 arranged along a horizontal direction, and gate electrodes 21 protruded from the gate lines 20. The storage capacitor line assembly includes storage capacitor lines 30 arranged along the horizontal direction substantially parallel to the gate lines 20. First to fourth storage capacitor electrodes 31 to 34 are branched from the storage capacitor line 30 together with storage capacitor electrode connectors 35 and 36. The first storage capacitor electrode 31 is directly connected to the storage capacitor line 30 while proceeding in the vertical direction. The second and the third storage capacitor electrodes 32 and 33 are connected to the first storage capacitor electrode 31 while proceeding in the horizontal direction. The fourth storage capacitor electrode 34 is connected to the second and the third storage capacitor electrodes 32 and 33 while proceeding in the vertical direction. The storage capacitor electrode connectors 35 and 36 interconnect the fourth storage capacitor electrode 34 at one pixel and the first storage capacitor electrode 31 at a neighboring pixel.

A gate insulating layer 40 is formed on the gate line assembly and the storage capacitor line assembly. A semiconductor pattern 50 is formed on the gate insulating layer 40 over the gate electrodes 21 with amorphous silicon. Ohmic contact patterns 61 and 62 (not shown) are formed on the semiconductor pattern 50 with amorphous silicon where n type impurities such as phosphorous (P) are doped at high concentration. The ohmic contact patterns 61 and 62 are separated from each other around the gate electrode 21.

A data line assembly is formed at the substrate 10. The data line assembly includes source electrodes 71 formed on the one-sided ohmic contact pattern 61, drain electrodes 72 formed on the other-sided ohmic contact pattern 62, and data lines 70 formed on the gate insulating layer 40 while proceeding in the vertical direction. The source electrodes 71 are connected to the data lines 70.

A protective layer 80 is formed on the data line assembly with contact holes 81 exposing the drain electrodes 72. Pixel electrodes 90 are formed on the protective layer 80 such that they are connected to the drain electrodes 72 through the contact holes 81. The pixel electrodes 90 are formed with a transparent conductive material such as indium tin oxide (ITO) and indium zinc oxide (IZO).

The pixel electrode 90 is separated into first to third electrode portions 91 to 93, and the first to third electrode portions 91 to 93 are connected to each other by way of connectors 94 to 96. The first electrode portion 91 is formed at the lower half side of the pixel region with a rectangular shape with four corner edges cut off. The first electrode portion 91 is connected to the drain electrode 72 through the contact hole 81. The second and the third electrode portions 92 and 93 are formed at the upper half of the pixel region, each also having a rectangular shape with four corner edges cut off. The second electrode portion 92 is connected to the first electrode portion 91 by way of the first and the second connectors 94 and 96, and the third electrode portion 93 is connected to the second electrode portion 92 by way of the third connector 95.

The second storage capacitor electrode 32 is positioned between the first and the second electrode portions 91 and 92. The third storage capacitor electrode 33 is positioned between the second and the third electrode portions 92 and 93. The first and the fourth storage capacitor electrodes 31 and 34 are positioned between the pixel electrode 90 and the neighboring data lines 70, respectively.

Each of the first to the third electrode portions 91 to 93 has a first side proceeding parallel to the data lines 70, and a second side proceeding parallel to the gate lines 20. The first side of the first electrode portion 91 is longer than the second side thereof. The first side of the second and the third electrode portions 92 and 93 is shorter than the second side thereof. The second and the third electrode portions 92 and 93 are overlapped with the first and the fourth storage capacitor electrodes 31 and 34, whereas the first electrode portion 91 is not overlapped with the first and the fourth storage capacitor electrodes 31 and 34. The storage capacitor line 30 is positioned between the gate line 20 and the third electrode portion 93. An electric potential to be applied to a common electrode of a color filter substrate would be also applied to the storage capacitor lines 30, the storage capacitor electrodes 31 to 34, and the storage capacitor electrode connectors 35 and 36.

As described above, when the storage capacitor lines or the storage capacitor electrodes to be applied with a common electric potential are arranged between the data line and the pixel electrode or between the gate line and the pixel electrode, they prevent the electric field at the pixel region from being influenced by the data line electric potential and the gate line electric potential, thereby securing domain stability.

A color filter substrate for the liquid crystal display will be explained with reference to FIGS. 2 to 4.

As shown in the drawings, a black matrix 200 is formed on a transparent glass substrate 100 while defining the pixel regions. The black matrix 200 preferably includes a double-layered structure with a chrome-based layer and a chrome oxide-based layer. Color filters of red (R), green (G) and blue (B) 310, 320 and 330 are formed at the pixel regions. The color filters are different in thickness. Preferably, the thickness of the R color filter 310 is smaller than that of the G color filter 320, that is in turn smaller than that of the B color filter 330. This thickness differentiation is to make the cell gap differ at the respective pixel regions. An overcoat layer 600 covers the RGB color filters 310, 320 and 330 to protect them, and a common electrode 400 is formed on the overcoat layer 600 with a transparent conductive material. An opening pattern is formed on the common electrode 400 at each pixel region with first to third opening portions 410, 420 and 430. The first opening portion 410 bisects the lower half of the pixel region in the horizontal direction, and the second and the third opening portions 420 and 430 trisect the upper half of the pixel region in the vertical direction. Both ends of each opening portion 410, 420 or 430 are gradually enlarged to form a triangular shape, preferably an isosceles triangle. The first to third opening portions 410, 420 and 430 are separated from each other.

The thin film transistor array substrate is combined with the color filter substrate, and a liquid crystal material 900 is injected between the substrates. At this time, the directors of the liquid crystal molecules are vertically aligned with respect to the substrates. Two polarizing plates 11 and 101 are externally attached to the substrates 10 and 100 such that the polarizing axes thereof are perpendicular to each other.

In this state, the electrode portions 91 to 93 of the pixel electrode 90 and the first to third opening portions 410 to 430 of the common electrode 400 are overlapped with each other while partitioning the pixel region into a plurality of microdomains. Each of the electrode portions 91 to 93 of the pixel electrode 90 has two long sides and two short sides, and the long sides of each electrode portion proceed in a direction parallel to the data lines 70 or the gate lines 20 while being inclined with respect to the polarizing axes of the polarizing plates by 45°.

In case the long side of each electrode portion is positioned close to the data lines 70 or the gate lines 20, the storage capacitor lines 30 or the storage capacitor electrodes 31 to 34 are arranged between the data lines 70 and the long sides of the electrode portion, or between the gate lines 20 and the long sides of the electrode portion.

Meanwhile, it is preferable that the storage capacitor line assembly be not disposed close to the short sides of the electrode portions 91 to 93 of the pixel electrode 90. In a case wherein the storage capacitor line assembly was disposed there, it would be entirely covered by the pixel electrode 90, or positioned distant from the pixel electrode 90 by 3 μm or more. This is because the electric potential of the data lines 70 or the gate lines 20 works in the direction of obstructing the domain formation at the place where the data lines 70 or the gate lines 20 is positioned close to the long sides of the pixel electrode portions 91 to 93, whereas the electric potential of the data lines 70 or the gate lines 20 works in the direction of helping the domain formation at the place where the data lines 70 or the gate lines 20 is positioned close to the short sides of the pixel electrode portions 91 to 93.

Meanwhile, the liquid crystal material 900 is injected between the common electrode 400 and the pixel electrodes 91. As described above, since the RGB color filters 310 to 330 are differentiated in thickness, the distance between the common electrode 400 and the pixel electrode 90 is differentiated at the RGB pixel regions. That is, the cell gap is differentiated at the RGB pixel regions. The R cell gap at the R pixel region is larger than the G cell gap at the G pixel region that is in turn larger than the B cell gap at the B pixel region. The B cell gap is smaller than the average value of the R cell gap and the G cell gap by 0.2±0.15 μm. Furthermore, the difference $\Delta d_2$ between the G cell gap and the B cell gap is greater than the difference $\Delta d_1$ between the R cell gap and the G cell gap. That is, $\Delta d_1 < \Delta d_2$. In case the RGB cell gaps are differentiated, the inter-gray scale color shift can be reduced.

Figure 5:
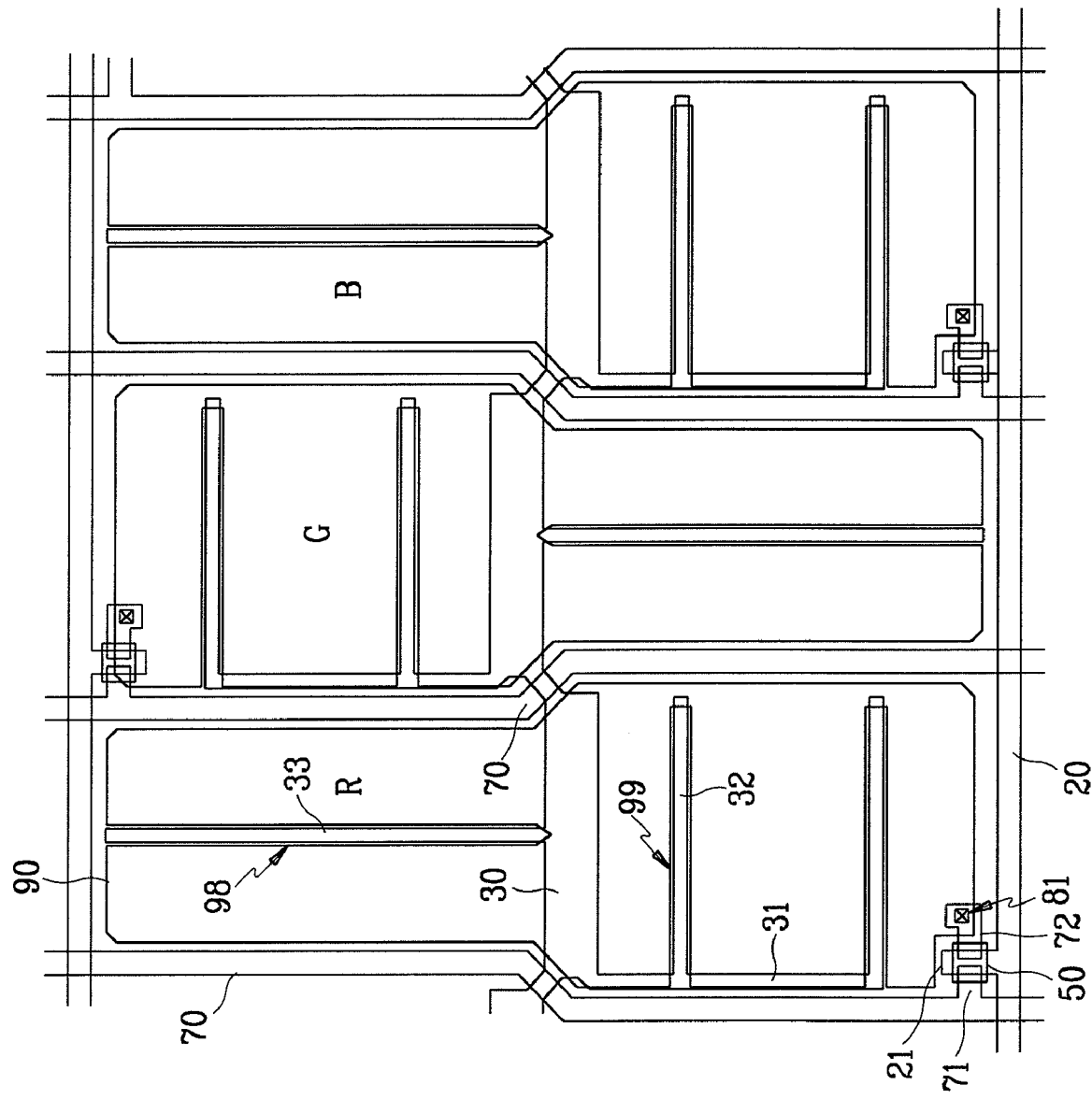
FIG. 5 is a plan view of a liquid crystal display according to a second preferred embodiment of the present invention where an opening pattern of a pixel electrode is illustrated.
Figure 6:
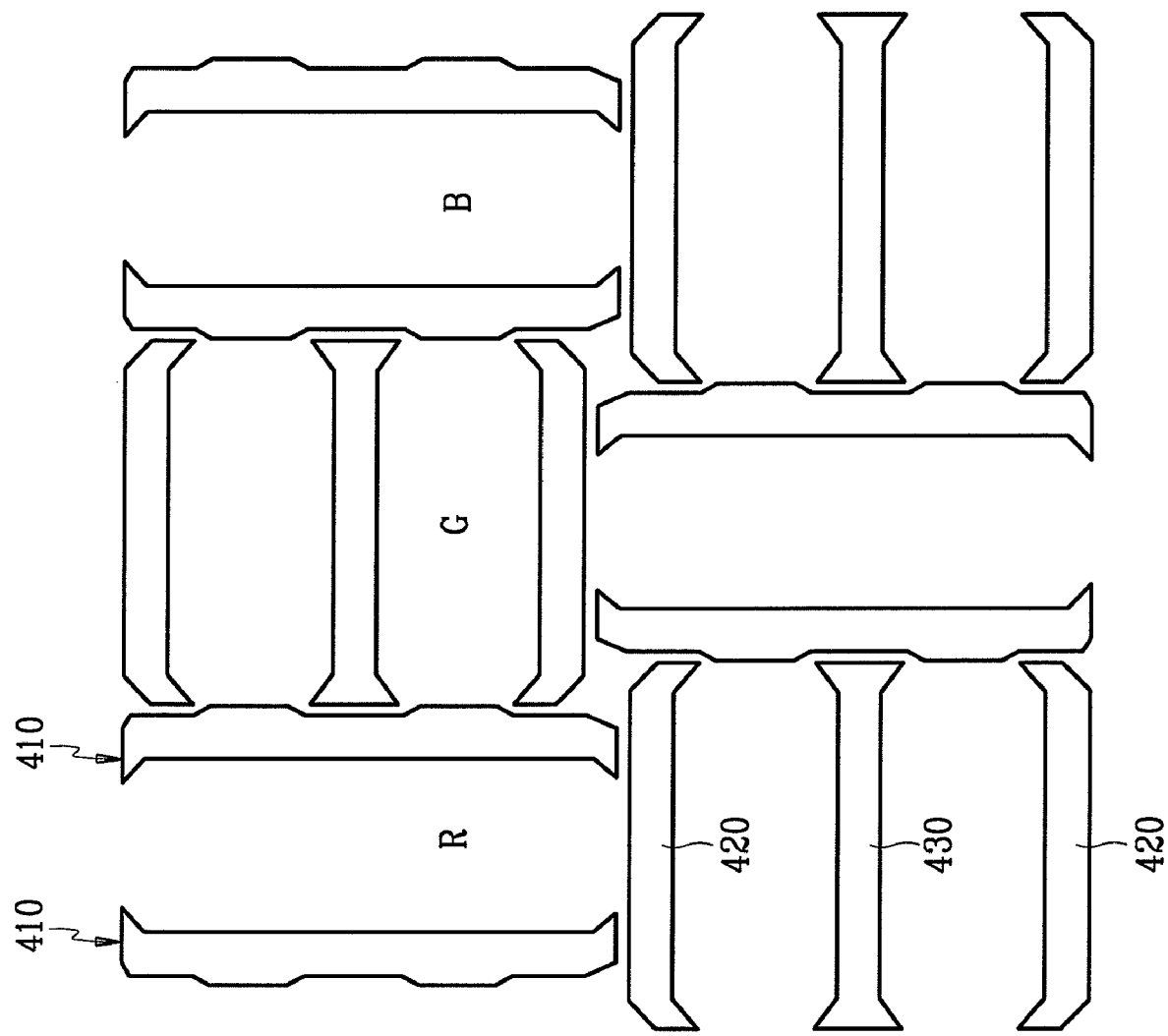
FIG. 6 illustrates an opening pattern of a common electrode for the liquid crystal display shown in FIG. 5.
Figure 7:
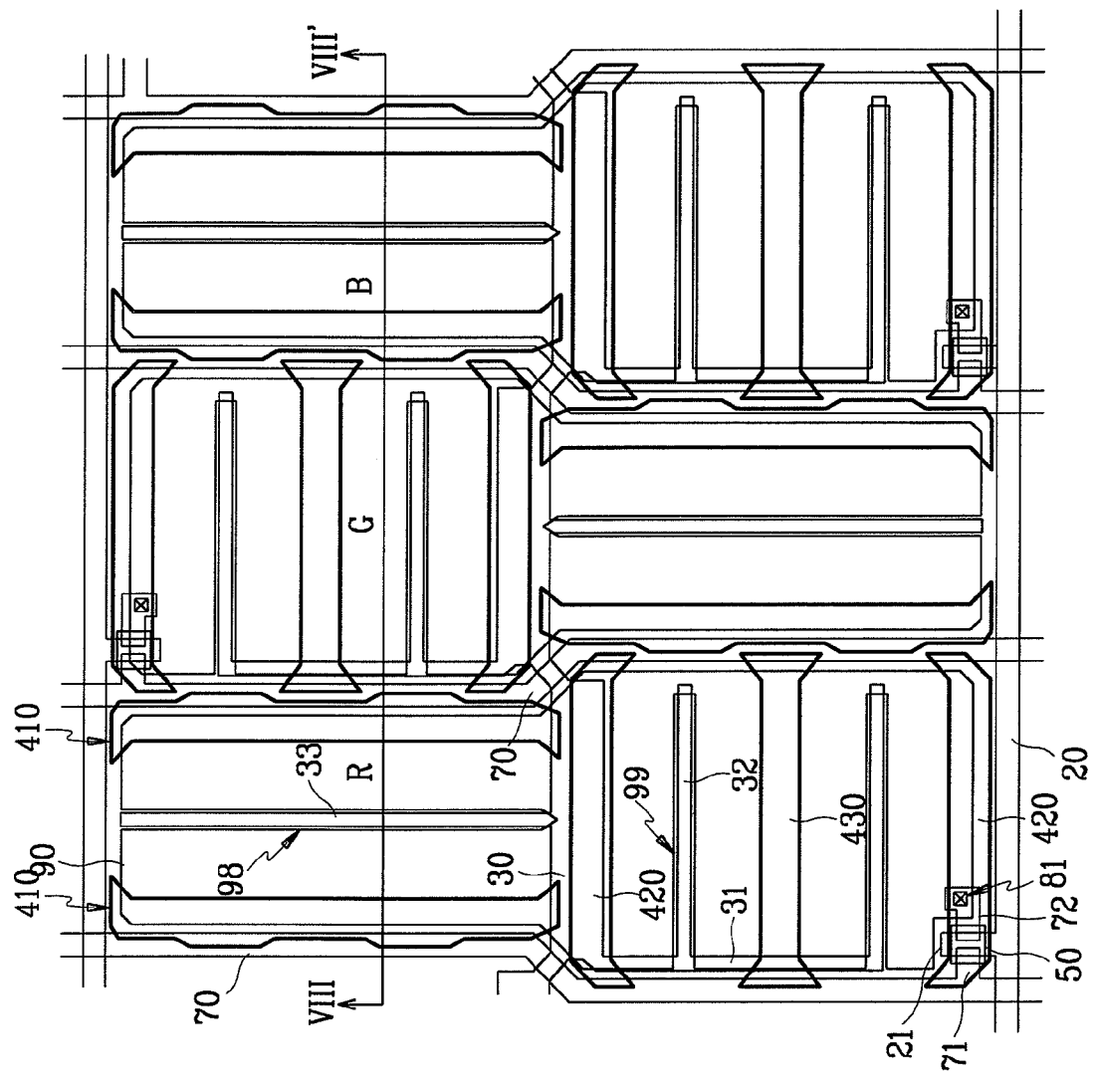
FIG. 7 illustrates the arrangement of the opening patterns of the pixel and the common electrodes for the liquid crystal display shown in FIG. 5.
Figure 8:
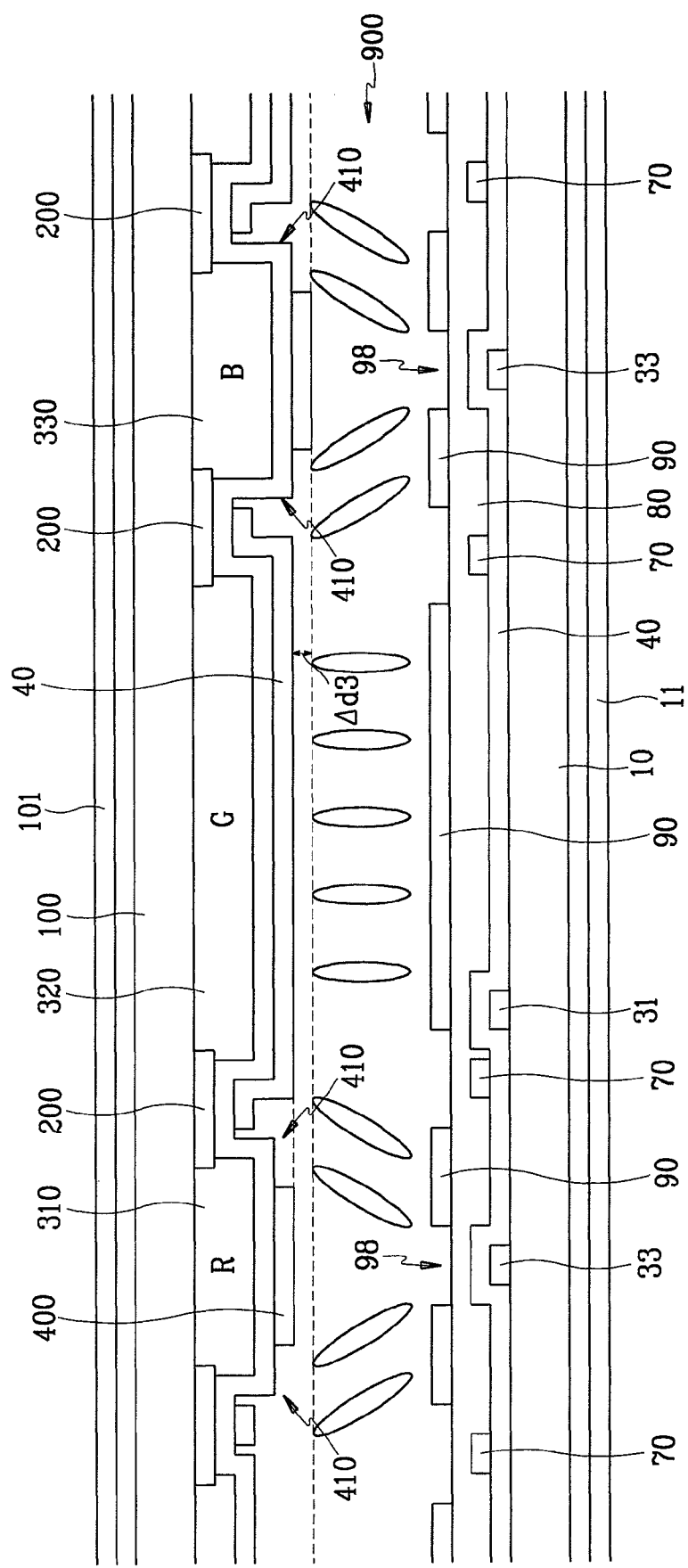
FIG. 8 is a cross sectional view of the liquid crystal display taken along the VIII-VIII' line of FIG. 7.

FIG. 5 is a plan view of a liquid crystal display according to a second preferred embodiment of the present invention wherein an opening pattern of a pixel electrode is illustrated, and FIG. 6 illustrates an opening pattern of a common electrode for the liquid crystal display. FIG. 7 illustrates the arrangement of the opening patterns of the pixel and the common electrodes for the liquid crystal display. FIG. 8 is a cross sectional view of the liquid crystal display taken along the VIII-VIII' line of FIG. 7.

As shown in FIGS. 5 to 8 of the drawings, a gate line assembly and a storage capacitor line assembly are formed on an insulating substrate 10. The gate line assembly includes gate lines 20 proceeding in a horizontal direction, and gate electrodes 21 protruded from the gate lines 20. The storage capacitor line assembly includes storage capacitor lines 30 proceeding in the same direction as the gate lines 20. The storage capacitor line 30 has a plurality of linear portions with a large width and connectors interconnecting the linear portions having a smaller width. The linear portions are arranged around an imaginative straight line up and down in an alternate manner. First and second storage capacitor electrodes 33 and 31 are connected to the storage capacitor line 20 while proceeding in a vertical direction, and third storage capacitor electrodes 32 are connected to the second storage capacitor electrode 31 while proceeding in the horizontal direction.

A gate insulating layer 40 is formed on the gate line assembly and the storage capacitor line assembly.

A semiconductor pattern 50 is formed on the gate insulating layer 40 with hydrogenated amorphous silicon such that it is overlapped with the gate electrodes 21.

Ohmic contact patterns (not shown) are formed on the semiconductor pattern 50 with n+ hydrogenated amorphous silicon where n-type impurities are doped at high concentration. The ohmic contact patterns are separated from each other around the gate electrode 21.

A data line assembly is formed on the gate insulating layer 40. The data line assembly includes data lines 70 formed on the gate insulating layer 40 while proceeding in the vertical direction. The data line 70 has a plurality of linear portions, and connectors interconnecting the linear portions. The linear portions are arranged around an imaginative straight line left and right in an alternate manner. The distance between the neighboring linear portions placed around the imaginative straight line up and down or left and right is controlled in consideration of the occupation ratios of upper and lower domains, and left and right domains. As the neighboring data lines 70 are opposite to each other in the alternating order of the linear portions, narrow and wide regions are alternately present between the data lines 70. This structure is the same in the left and right directions as well as in the upper and lower directions. The data lines 70 are overlapped with the storage capacitor lines 30 and the gate lines 20. The overlapping of the data lines 70 and the storage capacitor lines 30 is made at the connectors thereof.

A protective layer 80 is formed on the data lines 70. A pixel electrode 90 is formed on the protective layer 80 at each pixel region with indium tin oxide (ITO) or indium zinc oxide (IZO). The pixel electrode 90 is connected to the drain electrode 72 through the contact hole 81. The pixel electrode 90 has a wide portion, and a narrow portion. Furthermore, the pixel electrode 90 bears an opening pattern. The opening pattern includes a first opening portion 98 formed at the narrow portion of the pixel electrode 90 along the vertical direction, and second opening portions 99 formed at the wide portion of the pixel electrode 90 along the horizontal direction. The narrow portion of the pixel electrode 90 is bisected by the first opening portion 98 left and right, and the wide portion of the pixel electrode 90 is trisected into a top domain, a middle domain and a bottom domain by way of the second opening portions 99. The middle domain has a width about two times greater than the top and the bottom domains. The first opening portion 98 is overlapped with the first storage capacitor electrode 33, and the second opening portions 99 are overlapped with the third storage capacitor electrodes 32.

A color filter substrate facing the thin film transistor array substrate will be explained with reference to FIGS. 8 to 10.

A black matrix 200 is formed on an insulating substrate 100, and RGB color filters 310, 320 and 330 are formed at the black matrix 200. The B color filter 320 has a thickness larger than the R or G color filter 310 or 320. This is to make the cell gap at the B pixel region smaller than the cell gap at the R or G pixel region. An overcoat layer 600 is formed on the color filters 310, 320 and 330, and a common electrode 400 is formed on the overcoat layer 600 with a transparent conductive material such as ITO and IZO. An opening pattern similar to that shown in FIG. 8 is formed at the common electrode 400. The opening pattern is formed with third opening portions 410 longitudinally proceeding in the vertical direction, and fourth and fifth opening portions 420 and 430 longitudinally proceeding in the horizontal direction. In the entire pixel structure, the set of the fourth and fifth opening portions 420 and 430 is positioned at the left and right sides of the set of the third opening portions 410, respectively. The boundary of the third opening portion 410 close to the fourth and the fifth opening portions 420 and 430 is hollowed such that it can be separated from the fourth and the fifth opening portions 420 and 430.

The thin film transistor array substrate 10 is combined with the color filter substrate 100 such that they are spaced apart from each other with a predetermined distance. A liquid crystal material is injected between the substrates 10 and 100 to form a liquid crystal layer 900, and sealing is made thereto. With no application of an electric field between the pixel electrode 90 and the common electrode 400, the directors of the liquid crystal molecules are vertically aligned with respect to the substrates 10 and 100.

The liquid crystal layer 900 is sandwiched between the common electrode 400 and the pixel electrode 91. Since the thickness of the B color filter 330 is larger than the R or G color filter 310 or 320, the distance between the common electrode 400 and the pixel electrode 90 at the B pixel region is smaller than that at the R or G pixel region. That is, the B cell gap at the B pixel region is smaller than the R cell gap at the R pixel region or the G cell gap at the G pixel region. The B cell gap is smaller than the R or G cell gap by 0.2±0.15 µm. That is, $\Delta d_3 = 0.2 \pm 0.15$ µm. In case the RGB cell gaps are differentiated, the inter-gray scale color shift is reduced.

In the combination state of the thin film transistor array substrate 10 and the color filter substrate 100, the third opening portions 410 are overlapped with the left and right sides of the narrow pixel electrode portion 90, and the fourth opening portions 420 are overlapped with the upper and lower boundaries of the wide pixel electrode portion 90. The fifth opening portion 430 is positioned at the wide portion of the pixel electrode 90 such that the former bisects the latter vertically or up and down. Accordingly, the narrow portion of the pixel electrode 90 is partitioned into two micro-domains by way of the first opening portion 98 and the third opening portions 410. The wide portion of the pixel electrode 90 is partitioned into four micro-domains by way of the second opening portions 99, and the fourth and fifth opening portions 420 and 430. It is preferable that the width of the micro-domain be 20±5 #µm. The width of the micro-domain is determined in consideration of the occupation ratios of the upper and lower domains B and the left and right domains A. When the width of the micro-domain is too narrow, the opening ratio is reduced. When the width of the micro-domain is too wide, the fringe field formation is too weak to control the inclining direction of the liquid crystal molecules. Furthermore, the occupation ratio of the upper and lower domains B may be established to be greater than the left and right domains A. It is preferable that the occupation ratio of the upper and lower domains B be 60-90% of the entire pixel region. In this way, the visibility at the left and right sides can be enhanced.

The above-structured opening patterns serve to significantly enhance the opening ratio. The resulting liquid crystal display bears an opening ratio of 48%. This can be done through varying the shape of the pixel electrode such that the upper and lower domains and the left and right domains thereof can be controlled in an appropriate manner. Furthermore, the opening pattern formed at the common electrode is positioned at the periphery of each pixel region that is screened by the black matrix 200. The third opening portions 410 are overlapped with the left and right sides of the narrow pixel electrode portion 90, and the fourth opening portions 420 are overlapped with the upper and lower boundaries of the wide pixel electrode portion 90. That is, the opening pattern is positioned at the place screened by the black matrix 200, or where the storage capacitor lines 30 are positioned. Therefore, the third and fourth opening portions 410 and 420 do not cause additional deterioration in the opening ratio.

In the liquid crystal display according to the second preferred embodiment, all of the micro-domains are rectangularly shaped to advantageously provide improved speed response and minimize texture occurrence at the edges of the micro-domains. The inter-gray scale color shift is reduced through differentiating the RGB cell gaps can be seen in the following data and analysis.

Figure 9:
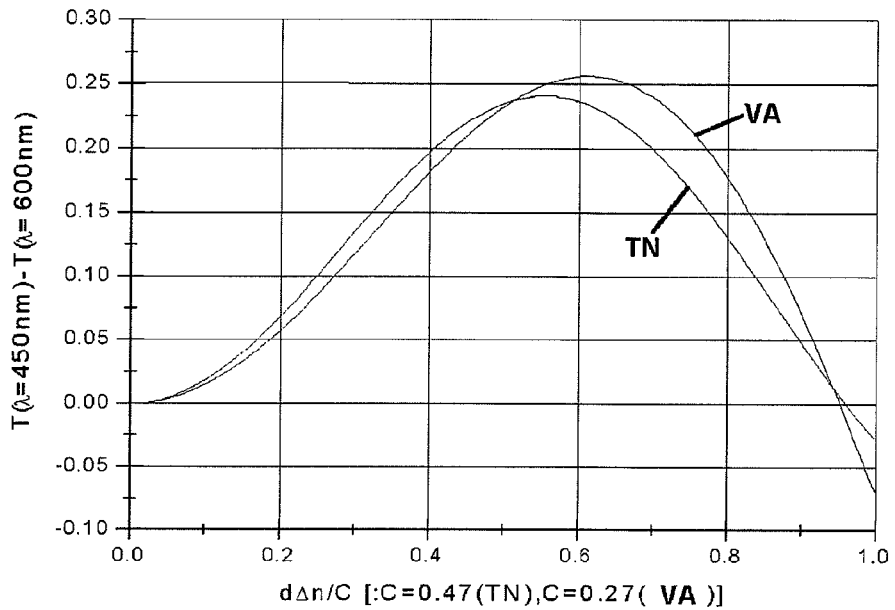
FIG. 9 is a graph illustrating the difference in light transmission as a function of Δn·d at the wavelengths of 450 nm and 600 nm.
Figure 10:
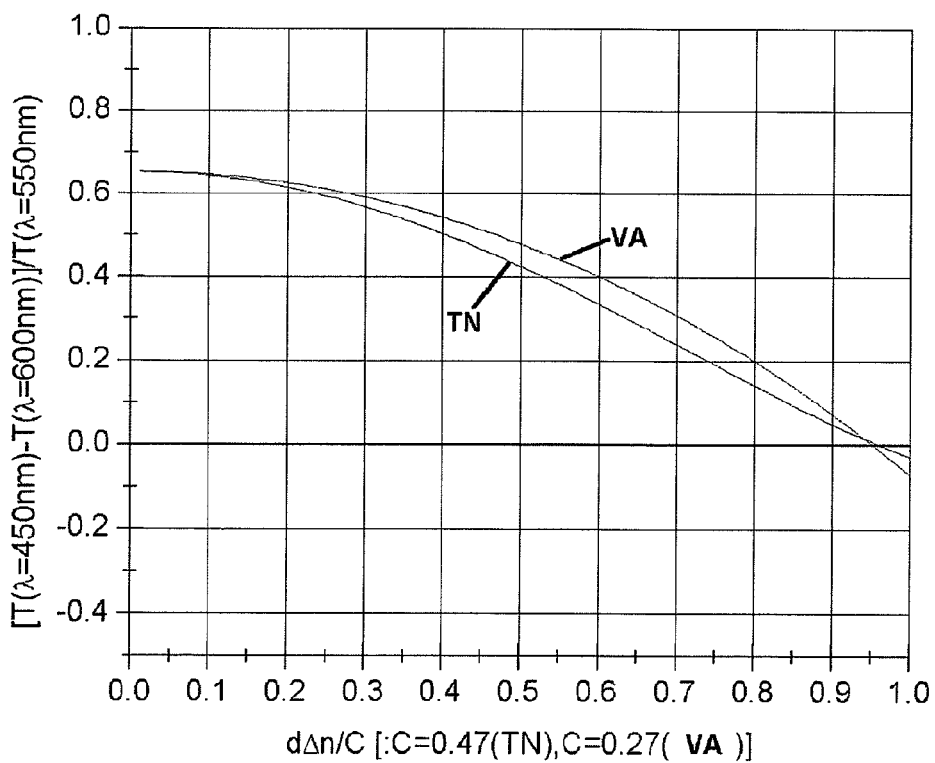
FIG. 10 is a graph where the values at the vertical axis of the graph of FIG. 9 are divided by the light transmission at the wavelength of 550 nm.

FIG. 9 is a graph illustrating the difference in light transmission as a function of Δn·d at the wavelengths of 450 nm and 600 nm, and FIG. 10 is a graph where the values of the vertical axis of the graph of FIG. 9 are divided by the light transmission at the wavelength of 550 nm. In the graphs, as the values of Δn·d where the light transmission is maximized at the TN and VA modes are 0.27 nm and 0.47 nm, the values of Δn·d are divided by 0.27 nm and 0.47 nm to normalize them.

As known from the graph of FIG. 9, in the VA or TN mode liquid crystal display, the variation in Δn·d causes the difference in light transmission at the wavelengths of 450 nm and 600 nm. This means that the increasing degree in the light transmission due to the increase in Δn·d differs at the wavelength of 450 nm, and at the wavelength of 600 nm. The reason is explained below.

The mathematical formula for determining the light transmission T at the TN mode is expressed by equation 1.

$$T=1-(\sin^2(\pi/2\sqrt{(1+u^2)}))/(1+u^2), u=2d\Delta n/\lambda \tag{1}$$

The mathematical formula for determining the light transmission T at the VA mode is expressed by equation 2.

$$T=\sin^2((\pi/2)u), u=2d\Delta n/\lambda \tag{2}$$

Meanwhile, the value of dΔn is altered depending upon variation in the voltage applied between the common electrode and the pixel electrode. That is, the liquid crystal molecules vertically aligned with respect to the substrates are inclined under the application of voltage so that the effective value of dΔn is increased. However, as known from the equations 1 and 2, the value of T is varied depending upon the value of u, that is in turn varied depending upon the values of dΔn and λ. As the value of T is varied depending upon the values of dΔn and λ, it is influenced by variation in the wavelength λ. Accordingly, T has diffusion characteristics at the respective wavelengths.

As known from the graph of FIG. 9, in the TN and VA modes, the light transmission with the shorter wavelengths is high at middle gray scales. This inclination is stronger in the VA mode than in the TN mode. Therefore, the inter-gray scale color shift phenomenon becomes more severe in the VA mode than in the TN mode.

As known from the graph of FIG. 10, the B color bearing a shortest wavelength exhibits high light transmission at lower gray scales, and the light transmission of the R and G colors is gradually heightened at higher gray scales. Accordingly, the yellow content where the R color and the G color are combined is increased and the yellowish phenomenon is seen.

This situation can be improved through controlling the RGB cell gaps. In the equation 2, in order that the value of T is not influenced by the wavelength of λ while being dependent upon only the value of Δn varied in accordance with the inclining degree of the liquid crystal molecules, equation 3 should be satisfied.

$$d=k\lambda \tag{3}$$

where k is a constant number.

In the case of a liquid crystal where the maximum value of Δn is 0.08, it is preferable in the aspect of brightness that the value of T in equation 2 should be maximized when Δn=0.08.

The value of T is maximized when u=1. When u=1, the second formula in equation 2 becomes 1=2dΔn/λ. In view of equation 3 and Δn=0.08, 1=2kΔn=2k×0.08. Therefore, k=1/0.16.

When k is applied to equation 3, equation 4 is obtained.

$$d=\lambda/0.16 \tag{4}$$

Assuming that the RGB wavelengths are 0.65 μm, 0.55 μm and 0.45 μm, the RGB cell gaps d should be 4.06 μm, 3.44 μm and 2.81 μm, respectively to eradicate the inter-gray scale color shift.

Figure 11:
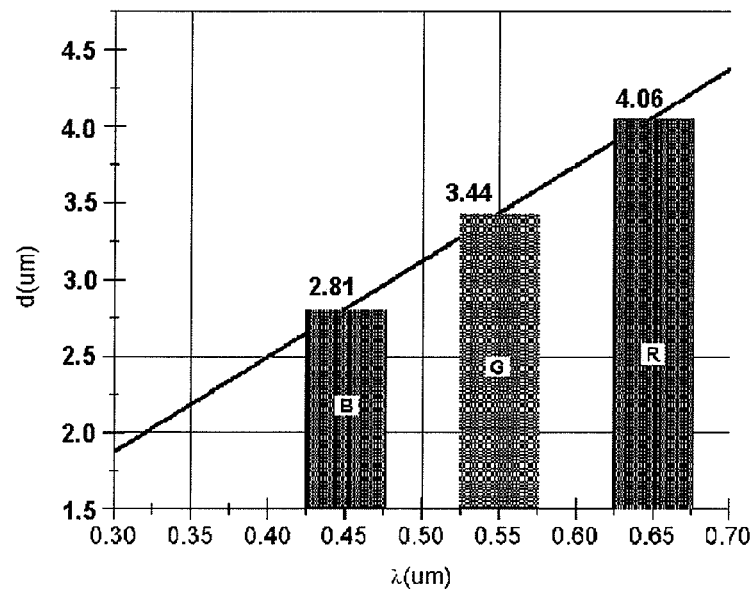
FIG. 11 is a graph illustrating the optimum RGB cell gaps in case the value of Δn is 0.08.

FIG. 11 is a graph illustrating the optimum RGB cell gaps when the maximum value of Δn is 0.08.

Meanwhile, the cell gaps d at the RGB pixel regions can be most easily controlled through controlling the thickness of the RGB color filters. However, as is known and can be seen from the graph of FIG. 11, the difference in the R and B cell gaps required to eradicate the inter-gray scale color shift reaches about 1.25. At such level, it becomes difficult in processing and making such a difference through controlling the thickness of the color filters. Furthermore, it is difficult to obtain uniformity in the cell gaps, making it nearly impossible to employ such a technique for practical use.

Therefore, a technique of easily making the cell gap difference in a practical manner while being effective in reduction of the inter-gray scale color shift is needed.

Figure 12A:
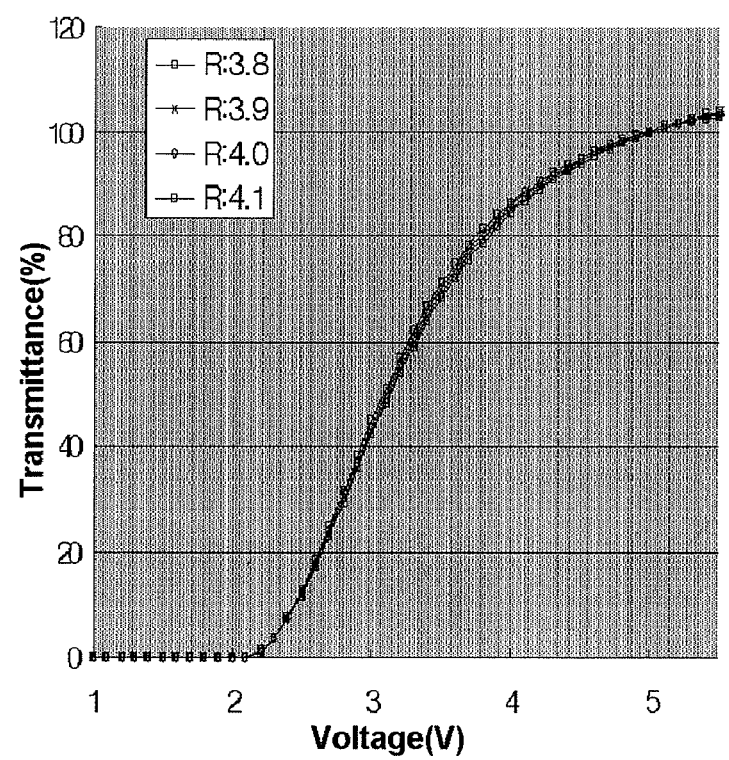
FIGS. 12A to 12C are graphs illustrating the V-T curves pursuant to the RGB cell gaps.
Figure 12B:
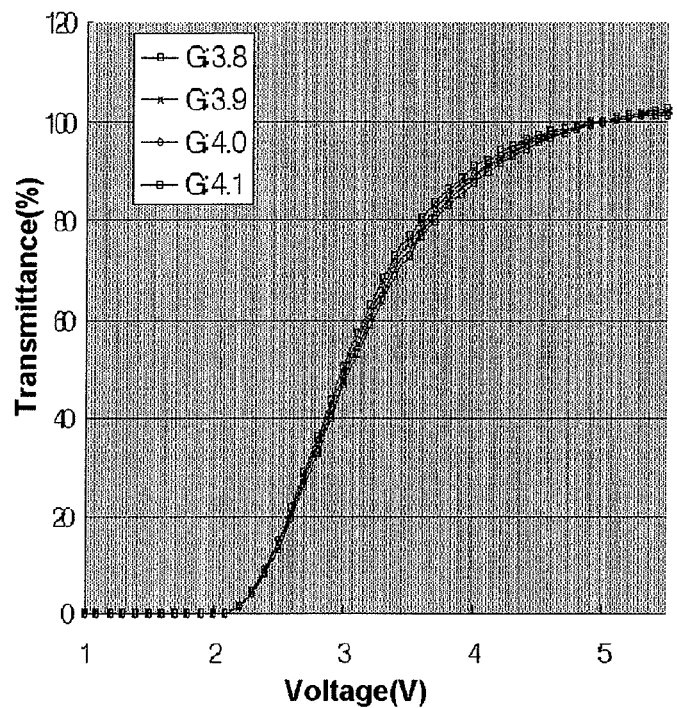
Figure 12C:
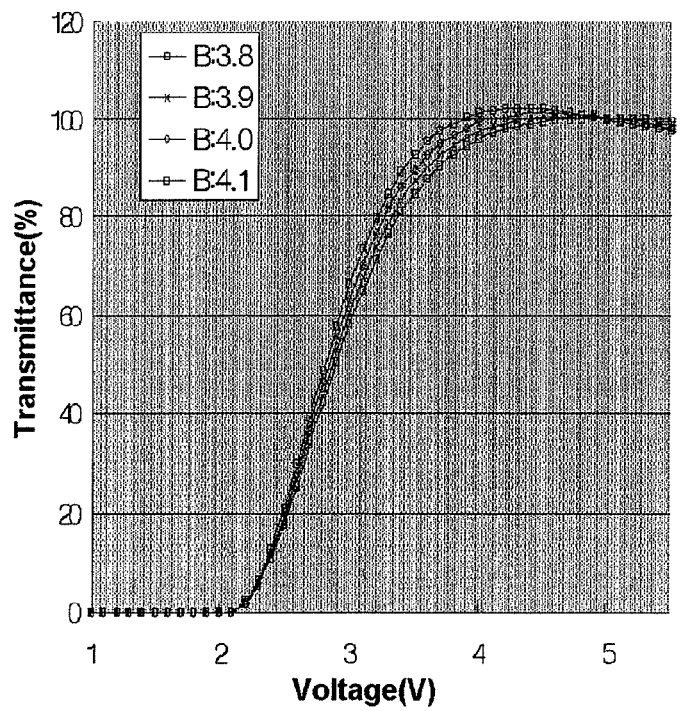

FIGS. 12A to 12C are graphs illustrating the V-T curves pursuant to the RGB cell gaps.

As known from the graphs, with variation in the cell gaps, the shape of the VT curve is most affected at the B color region. That is, since the shape of the VT curve is most sensitively altered at the B color region depending upon the variation in cell gap close to 4.0 μm, it would be most effective to control the cell gap at the B color region.

Meanwhile, in a patterned vertically aligned (PVA) mode where an opening pattern is formed at the electrode components to obtain wide viewing angle, as the electric field is weaker at the opening area than at the non-opening area, the effective value of Δn·d of the liquid crystal is small. Therefore, in the entire pixel structure, the VT curve related to the PVA mode is smoothly elevated compared to the VA or TN mode where the opening pattern is absent.

Figure 13:
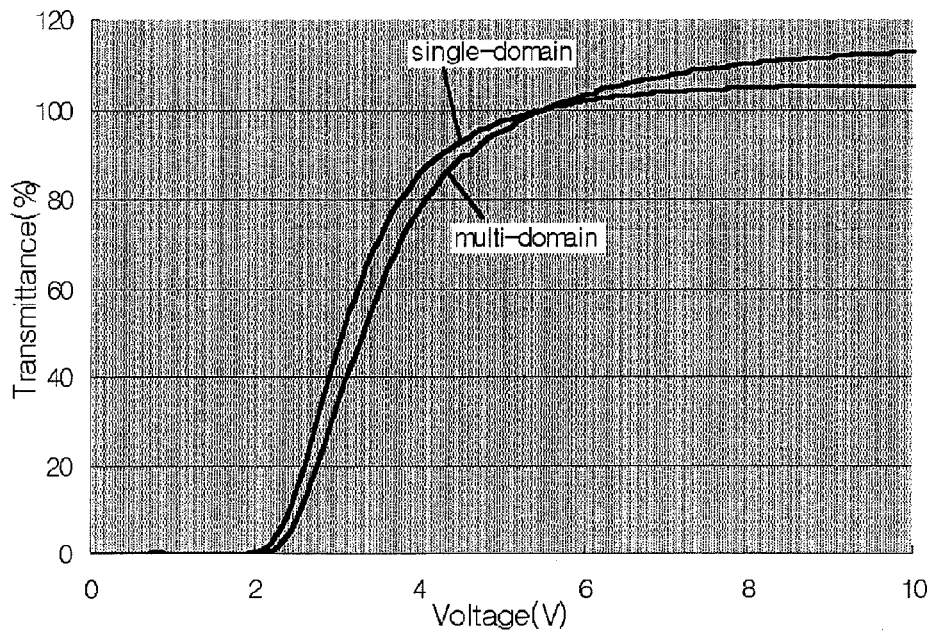
FIG. 13 is a graph illustrating the difference in the V-T curve at the single-domain structure and at the multi-domain structure.

FIG. 13 is a graph illustrating the difference in the V-T curve at the single-domain structure and at the multi-domain structure. As described earlier, the VT curve at the multi-domain structure where an opening pattern is present is smoothly elevated compared to that at the single-domain structure where such an opening pattern is absent. This provides an effect of self-correcting the color shift. In the case of the PVA mode, even an extremely small cell gap difference, such as a difference less than the theoretically computed cell gap difference of 1.25 µm may induce an effect of considerable reduction in the color shift.

Figure 14:
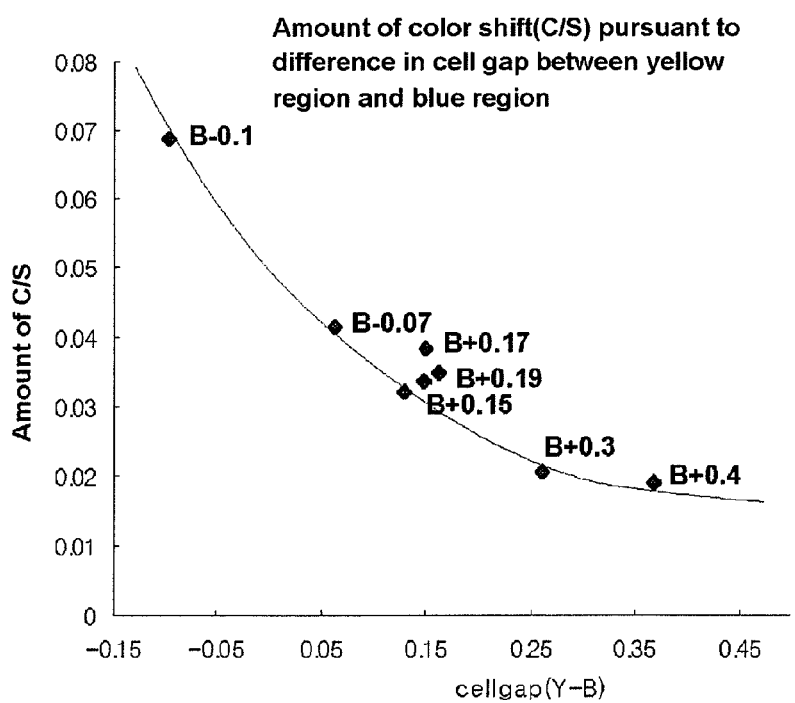
FIG. 14 is a graph illustrating the amount of color shift pursuant to the difference in cell gap at the yellow region (the average between the red region and the green region) and at the blue region.
Figure 15:
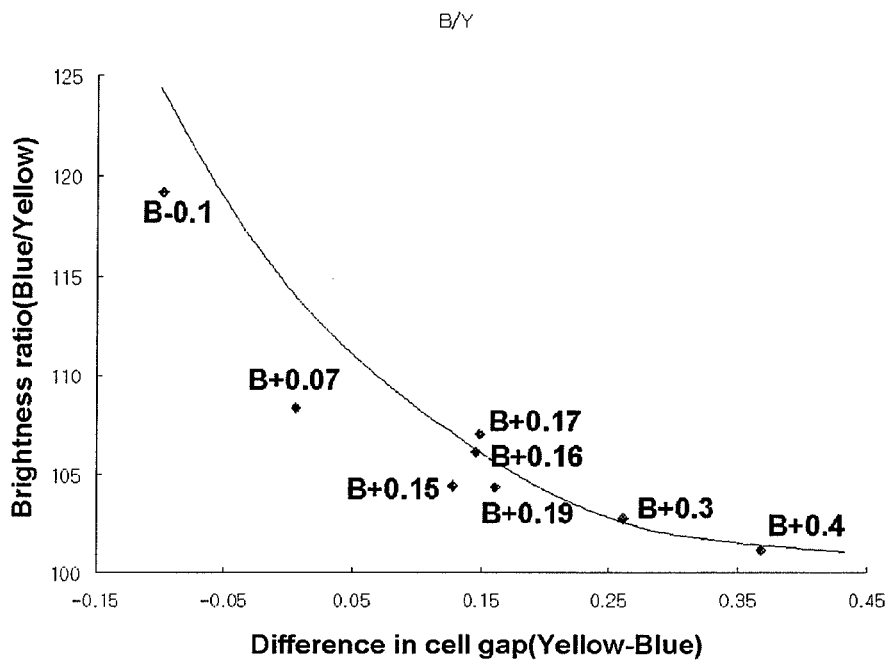
FIG. 15 is a graph illustrating the brightness ratio (blue/yellow) pursuant to the difference in cell gap between the yellow region and the blue region.
Figure 16:
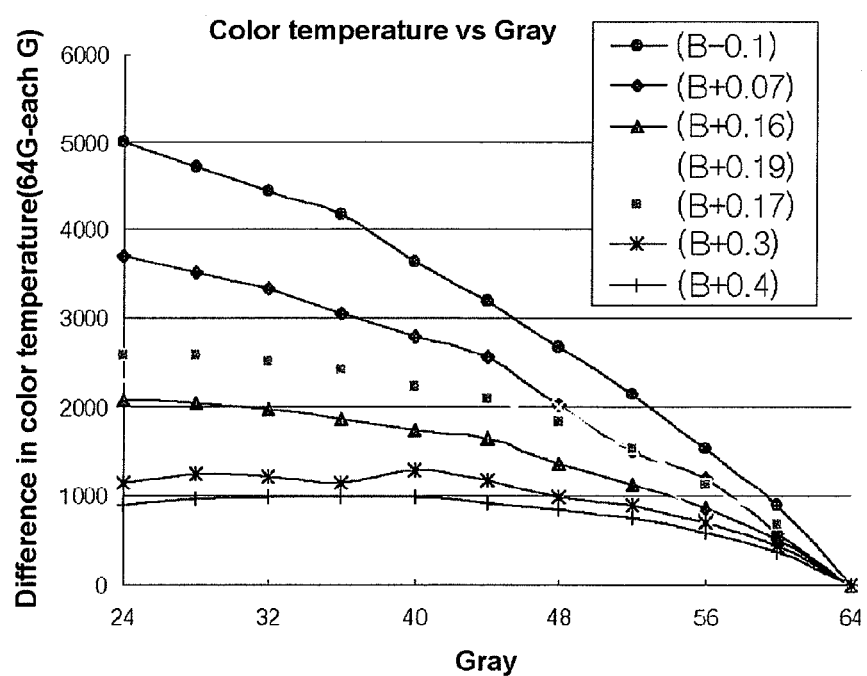
FIG. 16 is a graph illustrating the difference in color temperature per gray scales pursuant to the difference in cell gap between the yellow region and the blue region.

FIG. 14 is a graph illustrating the amount of color shift due to the difference in cell gap at the yellow region (the average between the red region and the green region) and at the blue region. FIG. 15 is a graph illustrating the brightness ratio (blue/yellow) due to the difference in cell gap between the yellow region and the blue region. FIG. 16 is a graph illustrating the difference in color temperature per gray scales due to the difference in cell gap between the yellow region and the blue region.

It can be seen from the graphs of FIGS. 14 and 15 that the inter-gray scale color shift is significantly reduced even when the B cell gap at the blue pixel region is smaller than the R or G cell gap at the red or green pixel region by 0.2-0.3 µm. This is because the variation in the B cell gap largely influences the color shift, and in the case of a PVA mode, the color shift is self-corrected due to the opening pattern.

Figure 17:
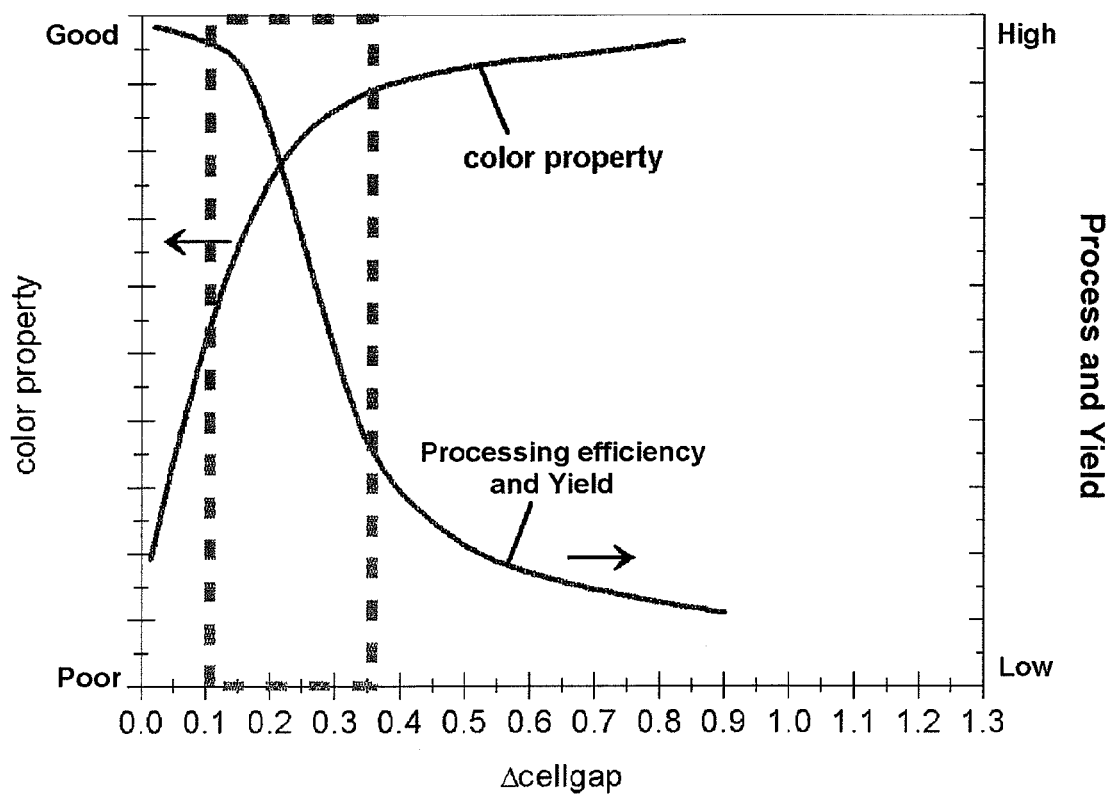
FIG. 17 is a graph illustrating the color property, and processing efficiency and variation in yield as a function of cell gaps.

FIG. 17 is a graph illustrating the color property, and processing efficiency and variation in yield as a function of cell gaps.

As shown in the graph of FIG. 17, the color property is improved when the cell gap difference is approximately 1.25 or higher. But the processing efficiency and the yield are lowered when the cell gap difference is increased. Accordingly, the B cell gap is established to be smaller than the R or G cell gap by 0.2±0.15 µm. In this condition, the color property is good, and the desired processing efficiency or yield is obtained.

As described above, when the B cell gap is established to be smaller than the R or G cell gap by 0.2±0.15 µm, the inter-gray scale color shift can be reduced, and the resulting display device can exhibit good picture quality. Furthermore, the G cell gap may be smaller than the R cell gap such that the RGB cell gaps are all differentiated from each other. In such case, it is preferable that the difference between the R and G cell gaps be greater than the difference between the G and B cell gaps. This is because, as shown from the graphs of FIGS. 12A to 12C, the variation in the B cell gap can induce greater effects.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display comprising:
 a first insulating substrate;
 a plurality of first wiring lines formed on the first insulating substrate;
 a plurality of second wiring lines crossing over the first wiring line formed on the first wiring lines that define a plurality of pixel regions, the second wiring lines being insulated from the first wiring lines;
 a plurality of pixel electrodes formed at each pixel region with first opening patterns therebetween;
 a thin film transistor comprising a gate electrode connected to the first wiring line, a source electrode connected to the second wiring line, and a drain electrode connected to the pixel electrode;
 a second insulating substrate facing the first insulating substrate; and
 color filters of red, green and blue formed on at least one of the first insulating substrate and the second insulating substrate;
 a common electrode formed on the second insulating substrate having second opening patterns;
 wherein a R cell gap indicates the thickness of the liquid crystal layer at the region of the red color filter, a G cell gap indicates the thickness of the liquid crystal layer at the region of the green color filter, and a B cell gap indicates the thickness of the liquid crystal layer at the region of the blue color filter, wherein the B cell gap is differentiated from the R cell gap or the G cell gap by: R cell gap–G cell gap<G cell gap–B cell gap, and
 wherein the first and second opening patterns partition each pixel region into a plurality of micro-domains.

2. The liquid crystal display of claim 1, further comprising:
 a liquid crystal layer sandwiched between the first and the second insulating substrates with liquid crystal molecules,
 wherein the liquid crystal molecules of the liquid crystal layer being vertically aligned with respect to the first and the second substrates when no electric field is applied between the pixel electrode and the common electrode.

3. The liquid crystal display of claim 2, wherein the B cell gap, the R cell gap and the G cell gap are differentiated from each other.

4. The liquid crystal display of claim 3, wherein the B cell gap is established to be smaller than the R cell gap or the G cell gap by 0.2±0.15 µm.

5. The liquid crystal display of claim 4, further comprising:
 a first polarizing plate and a second polarizing plate respectively attached to the first insulating substrate and the second insulating substrate.

6. The liquid crystal display of claim 5, wherein the polarizing axes of the first and second polarizing plates are inclined with respect to at least one of the first domain dividing member and the second domain dividing member by about 45°.

7. The liquid crystal display of claim 5,
 wherein the micro-domains are classified into left and right domains, and upper and lower domains, the volume occupied by the upper and lower domains being larger than the volume occupied by the left and right domains.

8. The liquid crystal display of claim 7, wherein the distance between two neighboring second wiring lines is repeatedly varied per a predetermined length, and the pixel electrode has lateral sides positioned close to the second wiring lines with the same outline such that the pixel electrode bears a narrow portion and a wide portion.

9. A process of manufacturing a liquid crystal display, comprising the steps of:
 forming a first insulating substrate;
 forming a plurality of first wiring lines on the first insulating substrate;
 forming a plurality of second wiring lines crossing over the first wiring lines that define a plurality of pixel regions, wherein the second wiring lines are insulated from the first wiring lines;
 forming a plurality of pixel electrodes at each pixel region with first opening patterns therebetween;
 forming a second insulating substrate facing the first insulating substrate;
 forming color filters of red, green and blue on at least one of the first insulating substrate and the second insulating substrate;

forming a common electrode on the second insulating substrate with the color filters having a second opening pattern; and differentiating a B cell gap from an R cell gap or a G cell gap by: R cell gap−G cell gap<G cell gap−B cell gap wherein the R cell gap indicates the thickness of the liquid crystal layer at the region of the red color filter, the G cell gap indicates the thickness of the liquid crystal layer at the region of the green color filter, and the B cell gap indicates the thickness of the liquid crystal layer at the region of the blue color filter, and wherein at least one of the first and second opening patterns partition each pixel region into a plurality of microdomains.

10. A process of manufacturing according to claim 9, further comprising:

foaming a liquid crystal layer sandwiched between the first and the second insulating substrates with liquid crystal molecules.

11. A process of manufacturing according to claim 10, wherein the liquid crystal molecules of the liquid crystal layer are vertically aligned with respect to the first and the second substrates when no electric field is applied between the pixel electrode and the common electrode.

12. A process of manufacturing according to claim 11, wherein the B cell gap, the R cell gap and the G cell gap are differentiated from each other.

13. The process of manufacturing according to claim 12, wherein the B cell gap is formed to be smaller than the R cell gap or the G cell gap by 0.2±0.15 µm.

* * * * *